United States Patent [19]
Lösch

[11] Patent Number: 4,648,693
[45] Date of Patent: Mar. 10, 1987

[54] REAR VIEW MIRROR

[75] Inventor: Dieter Lösch, Nuremberg, Fed. Rep. of Germany

[73] Assignee: Gebr. Buhler Nachfolger GmbH, Nuremberg, Fed. Rep. of Germany

[21] Appl. No.: 698,374

[22] Filed: Feb. 4, 1985

[30] Foreign Application Priority Data

Mar. 1, 1984 [DE] Fed. Rep. of Germany ....... 3407523

[51] Int. Cl.$^4$ ............................ B60R 1/06; G02B 5/08
[52] U.S. Cl. ................................. 350/636; 74/501 M; 248/487; 350/634; 350/637
[58] Field of Search ................................ 350/631–634, 350/636, 637; 248/474, 476, 479, 485–487; 74/501 M

[56] References Cited

U.S. PATENT DOCUMENTS 4,080,049  3/1978  Oskam et al. ..................... 350/636
4,158,483  6/1979  Fisher et al. ..................... 350/636
4,286,841  9/1981  Deshaw ............................ 350/636
4,498,738  2/1985  Kumai ............................. 350/637

Primary Examiner—John Petrakes
Attorney, Agent, or Firm—Mason, Fenwick & Lawrence

[57] ABSTRACT

A rear view mirror for vehicles which is adjustable in two planes and wherein a mirror support which supports the mirror glass is arranged inside a mirror housing and coupled through a cruciform joint with the housing which accommodates the adjusting drive. Adjustment of the mirror support relative to the mirror housing is obtained by application of the adjusting drive to the axes of the cruciform joint. The mirror assembly provides an absolutely sealed drive housing and is virtually unrestrictedly adjustable about the vertical axes, with minimized constructional depth, as both axes of the cruciform joint are connected with the drive housing, they are directly driven by the adjusting drive and are relatively independently rotatable, one axis being attached to the mirror support and the other axis to the mirror housing.

5 Claims, 3 Drawing Figures

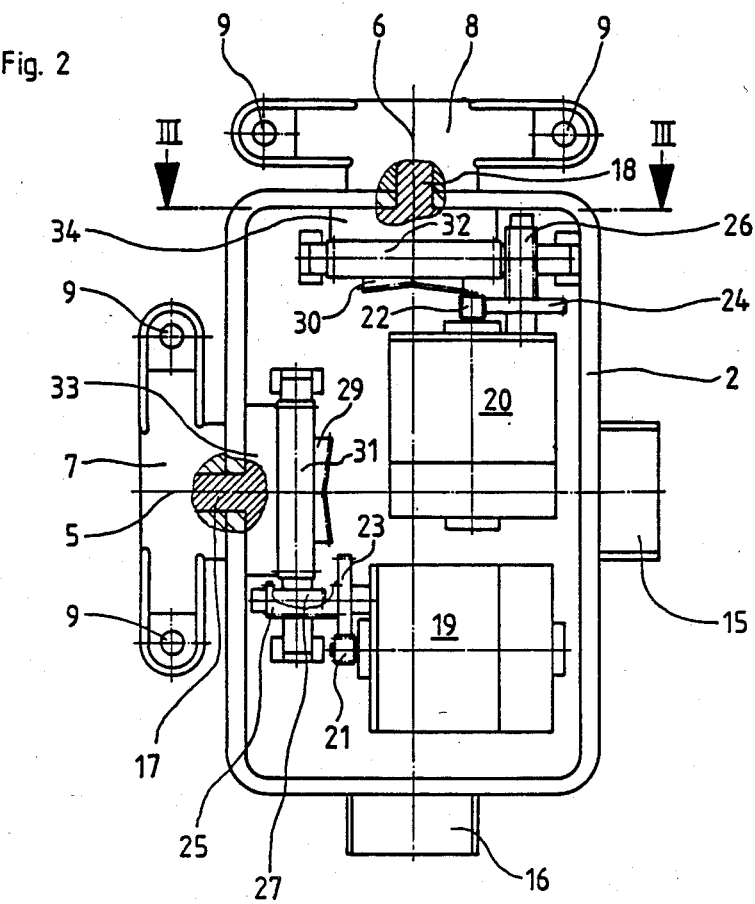
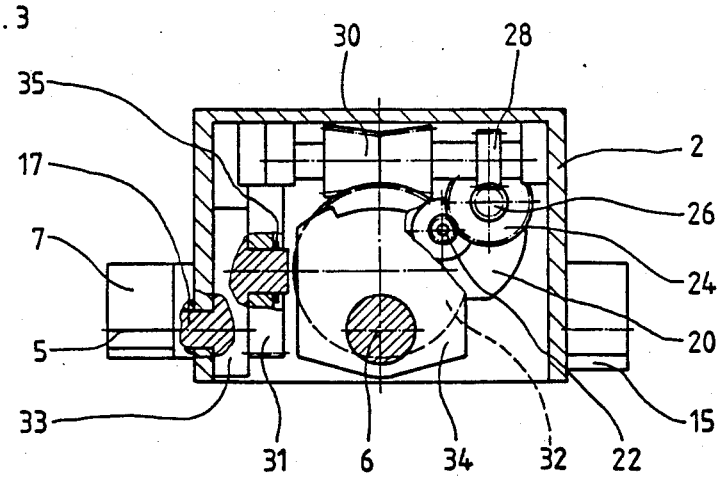

REAR VIEW MIRROR

BACKGROUND AND OBJECTS OF THE INVENTION

The invention relates to a rear view mirror for vehicles which is adjustable in two planes and in which the mirror support which holds the glass mirror is arranged within a mirror housing and coupled through a cruciform joint to the housing which accommodates the adjusting drive, an adjustment of the mirror support relative to the mirror housing being effected by the adjusting drive acting on the axis of said cruciform joint.

A rear view mirror for vehicles of this kind is known from German GM 82 17 325. In this known rear view mirror the adjustment of the mirror support is made through a pair of screw spindles operatively driven by the adjusting drive and of which one is in each case arranged in prolongation of one of the axes of the cruciform joint. These two axes of the cruciform joint are mutually rigidly connected at the point of intersection thereof, one axis being attached to the mirror support and the other being attached to the drive housing. However, it was found in practice that this constructional arrangement needed certain improvements.

In order to avoid vibrations of the mirror region which projects outwardly over the screw spindles these spindles must be sited as far out as possible; this entails a considerable spindle length and therefore also an unfortunately great constructional depth of the mirror housing which restricts the viewing range for the driver. Furthermore geometrical faults arise in the course of mirror adjustment because the cruciform joint axis which is secured to the stationary drive housing cannot follow the in- and out-displacements of the associated spindles in such a way that the prolongation of the axis will always pass through the center of the spindle head; this causes a wobbling movement for the associated spindle and therefore reduced functional efficiency for large adjusting angles. Furthermore, the provisions of proper seals at the spindle lead-through points in the drive housing requires substantial expense. Lastly, the spindle length limits the adjusting angle which is very unfavorable particularly in the case of interior mirrors.

It is the basic aim of the invention to provide a rear view mirror for vehicles which is no longer afflicted by these drawbacks. Starting with the initially described known rear view mirror for vehicles, the invention solves this problem by virtue of the fact that the cruciform joint axes:

(a) are both connected with the drive housing;
(b) are operated direct by the adjusting drive, and
(c) are relatively independently rotatable, one axis being attached to the mirror support and the other axis being attached to the mirror housing.

Due to this constructional arrangement the adjustment of the mirror in one plane is obtained by relative displacement of the unit comprising mirror support and mirror glass relative to the drive housing which is stationary during this movement and adjustment in the other plane is obtained by relative displacement of the unit comprising the drive housing, the mirror support and the glass mirror relative to the fixedly mounted mirror housing. In other words, adjustment of the mirror in the one plane has—primarily due to the relatively independent rotatability of the two cruciform joint axes—no effect whatsoever on the other plane so that no geometrical faults or errors can arise. The direct actuation of the joint axes by the adjusting drive eliminates the use of screw spindles and thus creates the precondition for shallow depth measurements and dispensation with sealing problems. Moreover, the joint axes of the cruciform joint may reach as far outwards from the drive housing as desired so that even very large mirrors may be supported in absolutely vibration-free manner. The adjusting angle of the rear view mirror according to the invention is virtually unrestricted.

According to another essential feature of the invention the axes of the cruciform joint are arranged in a plane but are not materially extended within the drive housing. This embodiment is one of several options for rendering the two axes of the joint relatively independently rotatable and would seem to be the most elegant constructional solution.

It was found to be of advantage if each of the two axes of the cruciform joint comprises an axle stub projecting outwardly over the drive housing and carrying a coupling element for operatively connecting the drive housing to the mirror support or to the mirror housing. This arrangement affords a very simple assembly and dismantling operation for the rear view mirror according to the invention and enables an uncomplicated exchange of the adjusting drive.

According to a further development of the invention each driven axis is associated with a slipping clutch which on the one hand fulfills the function of an overload safety device while on the other hand it creates the option of manual rear view mirror adjustment which may become necessary if the adjusting drive fails or the vehicle electrical system malfunctions.

BRIEF DESCRIPTION OF THE FIGURE

FIG. 2 is a top view of the drive housing with the cover removed therefrom; and

FIG. 3 is a sectional view taken on line III—III in FIG. 2.

DETAILED DESCRIPTION OF A PREFERRED EMBODIMENT

Figure 1:
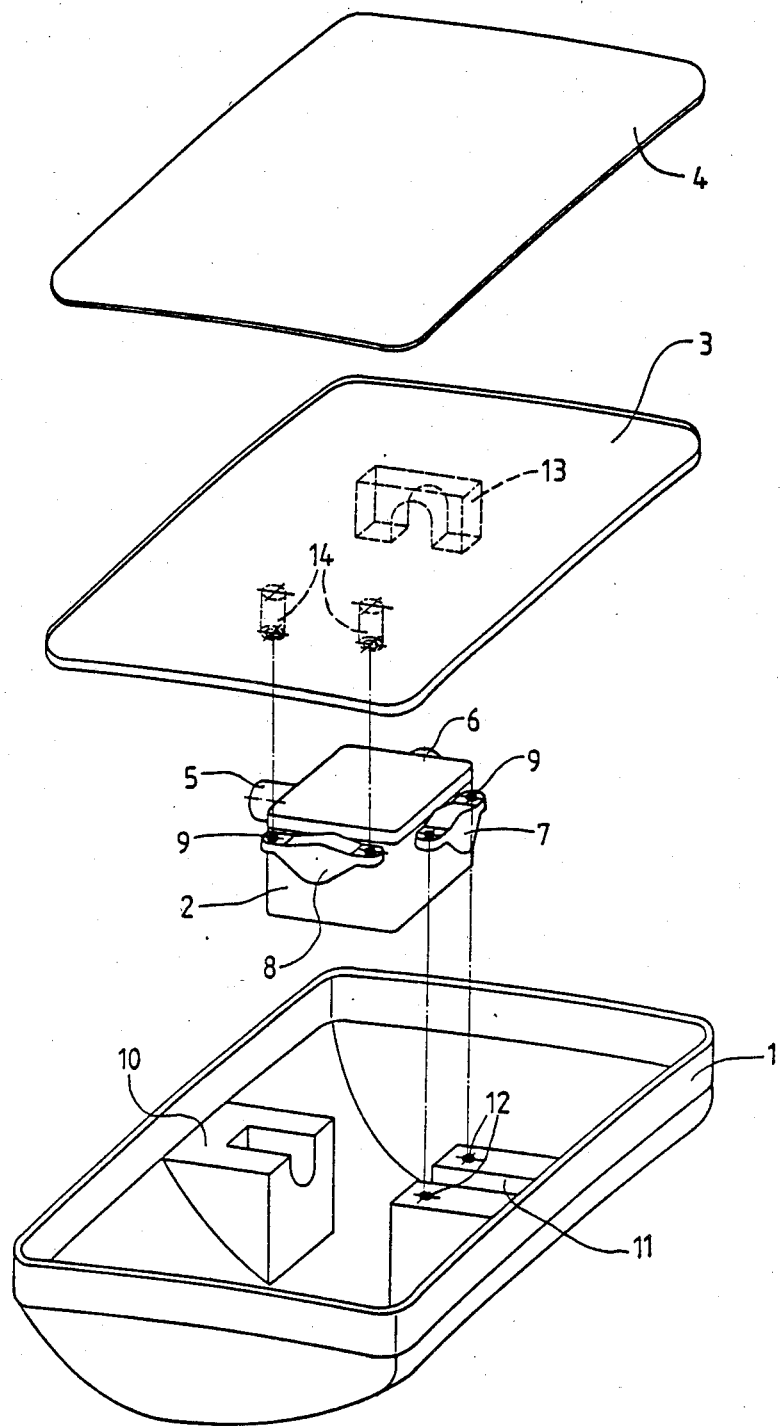
FIG. 1 is an exploded view of a rear view mirror for vehicles constructed in accordance with preferred embodiment of the invention.

The mirror assembly of the present invention as shown in the exploded view according to FIG. 1 comprises a mirror housing 1, a drive housing 2, a mirror support 3 and a glass mirror 4. It can be seen from this drawing that the drive housing 2 contains a cruciform joint of which the two mutually perpendicular axes 5 and 6 protrude on both sides beyond the outside housing wall. Each of the two joint axes 5, or 6, is provided at one end thereof with a coupling element 7, or 8, which comprises two bores 9. Inside the mirror housing 1 there are two relatively spaced juxtaposed bearing blocks 10 and 11 of which block 11 is provided with two bores 12. The left end, as shown in the drawing, of joint axis 5 is loosely placed into bearing block 10 and held down by a part (not shown), while the coupling element 7 of joint axis 5 is rigidly connected with bearing block 11 by means of coupling elements (e.g. screws) not shown, inserted into the mutually corresponding bores 9 and 12. In similar fashion a bearing block 13 and mountings 14 are provided on the underside of mirror support 3. The rear end, as shown in the drawing, of joint axis 6 is loosely placed into the bearing block 13 and held down by a retaining part (again not shown), while appropriate coupling means (not shown) engage in the mountings 14 after passing through the bores 9 of coupling element 8 associated with joint axis 5 or 6.

In other words, both joint axes 5 and 6 of the cruciform joint are mounted in, or connected to, the drive housing 2 but one axis 6 is attached to the mirror support 3 and the other axis 5 is attached to the mirror housing 1 which latter in its turn is fixedly mounted on the motor vehicle. In this case therefore, a rotation about axis 6 which is approximately horizontal in fitted state would adjust the unit consisting of a mirror support 3 and glass 4 relative to the, at this point stationary, drive housing 2 while rotation about axis 5 which is substantially vertical in the fitted state, would adjust the unit comprising drive housing 2, mirror support 3 and glass 4 relative to mirror housing 1.

FIG. 2 provides further details concerning the configuration of the two axes 5 and 6 of the cruciform joint. According to this figure, these two axes which extend in one plane (see FIGS. 1 and 3) are not materially extended within the drive housing 2; they consist in each case of a peg or pin 15 and 16 which is rigidly attached to, or integral with, the outside wall of the housing 2 and which alone fulfills the bearing function (bearing in block 10 or 13) and of an axle stub 17, 18 fitted rotatably in the wall of the housing 2, with the coupling element 7 or 8 mounted thereon. The joint axis 5 is thus embodied by pin 15 and axle stub 17 while joint axis 6 is embodied in pin 16 and axle stub 18.

FIG. 2, considered jointly with FIG. 3, further reveals details of the adjusting drive. The interior of drive housing 2 accommodates two mini-electromotors 19, 20 with relatively perpendicular drive shafts carrying pinions 21, 22. These pinions 21 and 22 mesh with spur gears 23, 24 which are drivingly associated with worms 25, 26 which in their turn are in driving engagement with worm wheels 27, 28 transmitting drive to further worms 29, 30. These worms 29, 30, which are globoidal or hourglass screws, drive the output worm wheels 31, 32 with which are drivingly connected the axle stubs 17, 18 of joint axes 5,6, respectively, which are arranged eccentrically relative to these worm wheels 31, 32, being eccentrically offset towards the upper rim of the drive housing 2, as hereinafter more particularly described. Due to the eccentrically offset positioning of axle stubs 17, 18 towards the upper rim of housing 2, the gap needed for a given adjusting angle of the mirror between the unit comprising mirror support and glass on the one hand and the framing of the mirror housing on the other is kept small.

The output worm wheels 31, 32 which are biased in the direction towards the inner housing wall by elastic spring-elements 35 pivot, when driven by worms 29 and 30 respectively about the joint axes 5 and 6 as fulcrums. At 33 and 34 the drawing shows a slipping clutch constructed in the form of a plate component carrying the axle stubs 17, 18. This plate component 33, or 34, by means of an end stop, limits the angle of pivotal displacement of the output worm wheels 31 and 32 and thus the rotational angle of axle stubs 17 and 18. On reaching the end stop the plate components 33 and 34 together with the axle stubs 17, 18 respectively, are arrested while the worm wheels 31 and 32 now rotate about their geometric center and no longer transmit drive to plate components 33, 34.

I claim:

1. A rearview mirror for vehicles which is adjustable in two planes, comprising a mirror housing containing a mirror-glass, a mirror-glass support in said mirror housing to support the mirror-glass arranged in the mirror housing, a universal joint coupling the support with the housing, an adjustable drive, a drive housing accommodating said adjustable drive, the universal joint having a pair of joint shafts, adjustment of the mirror-glass support relative to the mirror housing being obtained by actuation of the adjustable drive on the universal joint shafts, characterized in that the universal joint shafts:
   (a) are both connected with the drive housing,
   (b) are acted upon directly by the adjustable drive, and
   (c) can be rotated independently from each other, one of said shafts being attached to the mirror-glass support and the other shaft to the mirror housing.

2. A rear view mirror for vehicles according to claim 1, wherein the shafts of the universal joint are in one plane but not materially extended into the inside of the drive housing.

3. Rearview mirror or vehicles as claimed in claim 1 or claim 2, characterized in that each of the two universal joint shafts has at least one axle journal jutting out from the drive housing on which is arranged a coupling element for coupling the drive housing with the mirror-glass support or with the mirror housing.

4. A rear view mirror for vehicles according to claim 2, wherein a slipping clutch is associated with each of said joint axes.

5. A rear view mirror for vehicles according to claim 1, wherein a slipping clutch is associated with each of said joint shaft.

* * * * *